(12) United States Patent
Duricic et al.

(10) Patent No.: US 11,652,378 B2
(45) Date of Patent: May 16, 2023

(54) LAMINATED CORE FOR AN ELECTRIC MACHINE, IN PARTICULAR OF A MOTOR VEHICLE, ELECTRIC MACHINE FOR A VEHICLE, AND VEHICLE

(71) Applicant: Bayerische Motoren Werke Aktiengesellschaft, Munich (DE)

(72) Inventors: Dragoljub Duricic, Munich (DE); Alexander Maier, Glonn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 279 days.

(21) Appl. No.: 16/840,045

(22) Filed: Apr. 3, 2020

(65) Prior Publication Data
US 2020/0321818 A1 Oct. 8, 2020

(30) Foreign Application Priority Data
Apr. 5, 2019 (DE) ...................... 10 2019 109 047.4

(51) Int. Cl.
*H02K 1/32* (2006.01)
*H02K 5/20* (2006.01)
*H02K 9/19* (2006.01)

(52) U.S. Cl.
CPC ............... *H02K 1/32* (2013.01); *H02K 5/203* (2021.01); *H02K 9/19* (2013.01)

(58) Field of Classification Search
CPC ........... H02K 9/19; H02K 5/20; H02K 5/203; H02K 1/32
USPC .......................................................... 310/52
See application file for complete search history.

(56) References Cited

U.S. PATENT DOCUMENTS

| 3,660,702 | A | 5/1972 | Kishino |  |
|---|---|---|---|---|
| 8,614,528 | B2* | 12/2013 | Eichinger | H02K 3/24 310/59 |
| 8,866,351 | B2* | 10/2014 | Le Besnerais | H02K 9/19 310/58 |
| 9,225,224 | B2* | 12/2015 | Memminger | H02K 9/04 |

(Continued)

FOREIGN PATENT DOCUMENTS

| CN | 107508415 A | 12/2017 |
| DE | 10 2016 222 206 A1 | 5/2018 |

(Continued)

OTHER PUBLICATIONS

German-language Search Report issued in German Application No. 10 2019 109 047.4 dated Aug. 20, 2019 with partial English translation (14 pages).

*Primary Examiner* — Alex W Mok
(74) *Attorney, Agent, or Firm* — Crowell & Moring LLP

(57) ABSTRACT

A laminated core for an electric machine has at least one cooling duct which runs within the laminated core and can be flowed through by a cooling fluid for cooling the laminated core. The cooling duct has at least one first throughflow opening which can be flowed through by the cooling fluid and penetrates an outer circumferential-side shell face of the laminated core, which shell face points toward the outside in the radial direction of the laminated core. The cooling duct further has at least one second throughflow opening which can be flowed through by the cooling fluid and penetrates an inner circumferential-side shell face of the laminated core, which shell face points toward the inside in the radial direction of the laminated core.

7 Claims, 1 Drawing Sheet

(56) References Cited

U.S. PATENT DOCUMENTS

| | | | |
|---|---|---|---|
| 9,806,586 B2 * | 10/2017 | Granat | H02K 1/32 |
| 10,038,352 B2 * | 7/2018 | Airoldi | F03D 15/20 |
| 2014/0252893 A1 | 9/2014 | Veeh et al. | |
| 2018/0134310 A1 | 5/2018 | Benak et al. | |

FOREIGN PATENT DOCUMENTS

| | | |
|---|---|---|
| DE | 10 2016 222 331 A1 | 5/2018 |
| EP | 2 783 452 B1 | 8/2016 |
| JP | 2008-228523 A | 9/2008 |
| WO | WO 2016/070908 A1 | 5/2016 |

* cited by examiner

LAMINATED CORE FOR AN ELECTRIC MACHINE, IN PARTICULAR OF A MOTOR VEHICLE, ELECTRIC MACHINE FOR A VEHICLE, AND VEHICLE

CROSS REFERENCE TO RELATED APPLICATION

This application claims priority under 35 U.S.C. § 119 from German Patent Application No. 10 2019 109 047.4, filed Apr. 5, 2019, the entire disclosure of which is herein expressly incorporated by reference.

BACKGROUND AND SUMMARY OF THE INVENTION

The invention relates to a laminated core for an electric machine, in particular of a motor vehicle. Furthermore, the invention relates to an electric machine for a vehicle. The invention also relates to a vehicle, in particular a passenger car.

DE 10 2016 222 206 A1 discloses an electric machine, with a rotor which has a rotor laminated core and a rotor shaft which is mounted in two anti-friction bearings. Furthermore, the electric machine comprises a stator which has a stator laminated core and stator winding heads which are arranged on opposite end sides of the stator laminated core. Moreover, the electric machine comprises a housing which surrounds the stator in the radial direction. The rotor laminated core comprises a plurality of laminations which are stacked in a stack direction. The laminations have in each case at least one aperture which connects the end sides of the respective lamination to one another. The apertures of laminations which are offset in the stack direction are arranged offset with respect to one another in a circumferential direction of the laminations in such a way that at least one screw spindle-shaped cooling duct which runs through the rotor laminated core is formed, which cooling duct connects two opposite end sides of the rotor laminated core to one another.

Furthermore, EP 2 783 452 B1 discloses an electric machine which has a rotor and a stator which surrounds the former coaxially and can be cooled, with an annular stator laminated core with radially inwardly directed stator teeth. Stator grooves for receiving a field winding which is wound onto the stator teeth are formed between the stator teeth. The stator laminated core is formed from a number of stator laminations with through openings which are made on the circumferential side in said stator laminations in the stator yoke region which surrounds the stator teeth, which through openings are aligned with one another in the stator laminated core and form cooling ducts.

Moreover, a stator for an electric machine can be gathered as known from DE 10 2016 222 331 A1. The stator has at least one laminated core, in which a plurality of cooling ducts are configured which can be flowed through by a cooling fluid for cooling the stator and extend in the axial direction of the stator. Here, the respective cooling duct is delimited in a completely circumferential manner in its circumferential direction by way of the laminated core.

It is an object of the present invention to develop a laminated core, an electric machine and a vehicle of the type mentioned at the outset, in such a way that particularly advantageous cooling of the electric machine can be realized.

This and other objects are achieved by way of a laminated core, by way of an electric machine, and by way of a vehicle, in accordance with the claimed invention.

A first aspect of the invention relates to a laminated core for an electric machine, in particular of a vehicle. The vehicle can be a motor vehicle, in particular a motor car which is configured, for example, as a passenger motor car, or another vehicle such as an aircraft, in particular an airplane. The laminated core has at least one cooling duct which runs within the laminated core and can be flowed through by a cooling fluid for cooling the laminated core. The cooling fluid is preferably a cooling liquid such as oil, as a result of which particularly advantageous heat transport from the laminated core can be realized. In other words, as a result, a particularly high quantity of heat can be transported from the laminated core in a short time. Furthermore, it is contemplated that the cooling fluid is a gas, such as air.

In order then for the laminated core and therefore the electric machine to be cooled particularly effectively and efficiently and therefore, for example, for it to be possible for a particularly high performance and/or a particularly high continuous performance of the electric machine to be realized, it is provided according to the invention that the cooling duct has at least one first throughflow opening which can be flowed through by the cooling fluid and penetrates an outer circumferential-side shell face of the laminated core, which shell face points toward the outside in the radial direction of the laminated core. Therefore, for example, the cooling duct opens in the radial direction of the laminated core toward the outside to a surrounding area of the laminated core. As a result, for example, the cooling fluid can flow in the radial direction or parallel to the radial direction of the laminated core or else obliquely with respect to the radial direction of the laminated core from the surrounding area through the first throughflow opening, and can flow into the cooling duct, or else the cooling fluid which flows through the cooling duct can flow through the first throughflow opening in the radial direction of the laminated core or parallel to the radial direction of the laminated core or obliquely with respect to the radial direction of the laminated core, and can flow out of the cooling duct as a result and can flow into or onto the surrounding area.

Furthermore, the cooling duct has at least one second throughflow opening which can be flowed through by the cooling fluid and penetrates an inner circumferential-side shell face of the laminated core, which shell face points toward the inside in the radial direction of the laminated core. As a result, for example, the cooling fluid can flow through the second throughflow opening from the surrounding area in the radial direction of the laminated core or parallel to the radial direction of the laminated core or obliquely with respect to the radial direction of the laminated core, and, as a result, can flow into the cooling duct via the second throughflow opening, or the cooling fluid which flows through the cooling duct can, for example, flow through the second throughflow opening, in particular in the radial direction of the laminated core or parallel to the radial direction of the laminated core or obliquely with respect to the radial direction of the laminated core, and, as a result, can flow out of the cooling duct via the second throughflow opening and can flow onto or into the surrounding area of the laminated core.

The invention is based, in particular, on the findings that, in the case of conventional electric machines, heat losses in the laminated core and in at least one winding are preferably dissipated by way of heat conduction into a cooling jacket, and are transported away there, for example, by way of a cooling liquid. This results, however, in a long path for realizing a sufficient transport of heat, and a sufficient transport of heat is additionally impaired by way of undesired transfers of heat, in particular when cooling ducts run outside the laminated core. A combination of said cooling with oil cooling is conceivable, it being possible for oil to move freely, and it being possible for heat losses to additionally be transported away. In the case of the oil cooling, the oil is preferably moved by way of a pump to defined critical points of the electric machine. The oil can also lead to side effects, in particular, in a rotor of the electric machine and in an air gap between the rotor and a stator of the electric machine.

The abovementioned problems and disadvantages can then be avoided by way of the laminated core according to the invention. Since the cooling duct runs within the laminated core and opens onto or into the surrounding area via the throughflow openings, particularly advantageous internal cooling, in particular oil cooling, of the laminated core can be realized.

A plurality of further cooling ducts preferably run within the laminated core, it being possible for the preceding and following comments with respect to the first cooling duct to be transferred to the plurality of further cooling ducts, and vice versa. In particular, direct cooling of teeth of the laminated core can be realized by way of the respective cooling duct, the teeth carrying, for example, at least one or precisely one winding or at least one or precisely one winding wire which forms the at least one winding. As a result, heat can be transported effectively and efficiently away from the cells and therefore away from the winding or from the winding wire. In particular, it is possible by way of the laminated core according to the invention to conduct the cooling fluid which is configured, for example, as oil through the cooling duct in a targeted manner. The laminated core according to the invention can be, for example, a constituent part of the rotor and therefore a rotor laminated core of the electric machine. Furthermore, it is contemplated that the laminated core according to the invention is a constituent part of the stator and is therefore configured as a stator laminated core. In other words, again, the following and preceding comments with respect to the laminated core can be transferred to the rotor and therefore to a laminated core of the rotor and to the stator and therefore to a laminated core of the stator, with the result that the cooling fluid can be conducted particularly advantageously and, in particular, at least substantially directly through the laminated cores or in the laminated cores of the rotor and the stator. It is possible, in particular, to conduct or to allow the cooling fluid which is also called a cooling medium to flow from the inside first of all through the laminated core of the rotor, then through the air gap between the rotor and the stator, and subsequently through the laminated core of the stator, as a result of which the electric machine can be cooled particularly efficiently.

It has been shown to be particularly advantageous if the cooling duct extends from the first throughflow opening, in particular without interruptions or continuously, to the second throughflow opening parallel to the radial direction of the laminated core or in the radial direction of the laminated core, with the result that the cooling duct then extends from the first throughflow opening, in particular without interruptions or continuously, to the second throughflow opening perpendicularly with respect to the axial direction of the laminated core. As a result, a flow path of the cooling fluid through the cooling duct from one of the throughflow openings toward the other throughflow opening can be kept particularly short, with the result that heat can be transported away from the laminated core particularly effectively and efficiently.

It is also provided in one particularly advantageous embodiment of the invention that the cooling duct extends from the first throughflow opening, in particular without interruptions or continuously, to the second throughflow opening obliquely with respect to the radial direction of the laminated core and therefore obliquely with respect to the axial direction of the laminated core. As a result, a particularly high strength of the laminated core can be ensured, it being possible at the same time for the laminated core and therefore the electric machine to be cooled effectively and efficiently. If the cooling duct runs from the first throughflow opening, in particular without interruptions or continuously, to the second throughflow opening obliquely with respect to the radial direction and obliquely with respect to the axial direction of the laminated core, the cooling duct runs obliquely through the laminated core and in the process in an at least substantially conical manner.

In order to realize particularly effective and efficient cooling, it is provided in a further refinement of the invention that the cooling duct extends rectilinearly from the first throughflow opening, in particular without interruptions or continuously, to the second throughflow opening.

A further embodiment is distinguished by the fact that, in particular over its complete extent which runs without interruptions from the first throughflow opening as far as the second throughflow opening, the cooling duct is delimited directly by way of the laminated core in a manner which runs around completely in the circumferential direction of the cooling duct. The feature that the cooling duct is delimited directly by way of the laminated core is to be understood such that the cooling fluid which flows through the cooling duct can flow directly onto and can therefore make contact directly with the laminated core or respective wall regions of the laminated core which delimit the cooling duct directly. As a result, a particularly advantageous, efficient and effective transfer of heat can take place from the laminated core to the cooling fluid which flows through the cooling duct, as a result of which the laminated core and therefore the electric machine can be cooled particularly effectively and efficiently.

In a further embodiment of the invention, the laminated core is constructed from a plurality of lamination segments which follow one another in the axial direction of the laminated core and are connected to one another, for example. Here, the cooling duct is formed by way of respective through openings of the lamination segments. The lamination segments are also called individual laminations, the respective through opening being configured, for example, as a cutout. The respective cutout is made, in particular stamped, in the respective lamination segment, for example. As a result, a particularly high strength of the laminated core can be ensured. In order to ensure a particularly high strength of the laminated core, the respective through opening is preferably made as only a short cutout in the respective lamination segment.

It has been shown to be particularly advantageous if the through openings are arranged offset with respect to one another in the radial direction of the laminated core. As a result, for example, respective first parts of the through openings overlap one another or are congruent, whereas respective second parts of the through openings are arranged without an overlap with respect to one another. In other words, the through openings or the cutouts for lamination segments which follow one another are arranged at different positions, in particular in the radial direction, with the result that, when viewed together, the cutouts result in the cooling duct, preferably in the radial direction, in particular in such a way that the cooling duct runs obliquely through the laminated core and in the process in a conical or cone-like manner. As a result, it is possible, in particular, that, on its path through the cooling duct and therefore through the through openings, the cooling fluid can be conducted particularly advantageously through the laminated core in a rectilinear and oblique manner with respect to the axial direction and in an oblique manner with respect to the radial direction, with the result that advantageous transport of heat can be ensured.

In particular, by virtue of the fact that the cooling duct runs obliquely with respect to the axial direction and obliquely with respect to the radial direction and therefore at least substantially diagonally, the lamination segments and therefore the laminated core and the through openings and the cooling duct can be produced in a simple and inexpensive way, for example, by means of a progressive die with selective punches, it being possible for a high strength of the respective lamination segments per se and therefore a high strength of the laminated core overall to be realized. Any problems with regard to the cooling fluid or a part of the cooling fluid which can pass into lamination intermediate spaces as a result of dynamic pressure can be counteracted by way of an efficient outflow possibility for the cooling fluid. The cooling fluid in the air gap can be extracted through the cooling ducts or through the cooling duct, in particular in the stator, in a targeted manner, for example, by way of a suction stage, in order to minimize losses. Therefore, a suction device is preferably provided, by means of which the cooling fluid which is received in the air gap can be extracted from the air gap. Here, the air gap is arranged in the radial direction between the stator and the rotor and is delimited, for example, in the radial direction toward the outside, in particular directly, by way of the stator, in particular by way of its laminated core, and in the radial direction toward the inside, in particular directly, by way of the rotor, in particular by way of its laminated core.

As an alternative or in addition, it is conceivable that an (in particular, variable) delivery pump is provided for delivering the cooling fluid, in particular through the cooling duct. For example, a cooling line, by means of which the laminated core or the electric machine is to be cooled or is cooled, can be set as required by way of the delivery pump, the delivery output of which, for example, can be set, in particular can be regulated, with the result that the cooling system which is configured, for example, as an oil cooling system can be set and adapted in a targeted manner and as required by way of varying or setting of the delivery output of the delivery pump.

A second aspect of the invention relates to an electric machine for a vehicle which can be driven by means of the electric machine, in particular electrically, and is configured, for example, as a motor vehicle, in particular a motor car and preferably as a passenger motor car. The vehicle can be configured as a land-based vehicle or else as an aircraft, with the result that the electric machine can be, for example, an aircraft drive or a constituent part of an aircraft drive of this type. The electric machine has at least one laminated core, in particular at least one laminated core according to the invention in accordance with the first aspect of the invention, and at least one cooling duct which runs within the laminated core and can be flowed through by a cooling fluid for cooling the laminated core.

In order for it then to be possible for the electric machine to be cooled particularly effectively and efficiently, it is provided according to the invention that the cooling duct has at least one first throughflow opening which can be flowed through by the cooling fluid and penetrates an outer circumferential-side shell face of the laminated core, which shell face points toward the outside in the radial direction of the laminated core. Moreover, the cooling duct has at least one second throughflow opening which can be flowed through by the cooling fluid and penetrates an inner circumferential-side shell face of the laminated core, which shell face points toward the inside in the radial direction of the laminated core. Advantages and advantageous refinements of the first aspect of the invention are to be considered to be advantages and advantageous refinements of the second aspect of the invention, and vice versa.

It has been shown to be particularly advantageous here if the laminated core is surrounded on the outer circumferential side at least in one part region by a component of the electric machine. Here, the component has at least one duct which is connected fluidically to the cooling duct via the first throughflow opening. The at least one duct is also called the first duct, for example. The component is, for example, a component of a stator of the electric machine, it being possible, for example, for the component to be a carrier of the stator, which carrier is also called a stator carrier. Here, the laminated core which is configured separately from the component, for example, is connected to the component or is fastened to the component. In particular, the laminated core is carried by the component.

Furthermore, the electric machine has, for example, a rotor which can be driven by the stator and, as a result, can be rotated about a rotational axis relative to the stator. The stator surrounds the rotor at least in one region, an air gap being arranged, for example, in the radial direction between the stator and the rotor. For example, the cooling duct opens via the second throughflow opening into the air gap. As a result, for example, the cooling fluid can flow from the air gap via the second throughflow opening into the cooling duct and, as a consequence, can flow through the cooling duct. Thereupon, the cooling fluid which flows through the cooling duct can flow via the first throughflow opening out of the cooling duct and into the first duct, as a result of which, for example, the stator or the laminated core of the stator can be cooled effectively and efficiently.

A further embodiment is distinguished by the fact that the laminated core surrounds at least one part of a component of the electric machine, the component having at least one line element which is connected fluidically to the cooling duct via the second throughflow opening. The component is, for example, a component of the rotor of the electric machine, it being possible for the component to be, for example, a shaft of the rotor. The line element is also called a second duct. For example, the cooling fluid which flows through the second duct can flow via the second throughflow opening into the cooling duct and, as a consequence, can flow through the cooling duct. Via the first throughflow opening, the cooling duct opens, for example, into the above-described air gap, with the result that the cooling fluid which flows through the cooling duct can flow via the first throughflow opening out of the cooling duct and into the air gap. As a result, for example, the laminated core of the rotor and therefore the rotor can be cooled effectively and efficiently.

A third aspect of the invention relates to a vehicle which is configured, for example, as a motor vehicle, in particular as a motor car and preferably as a passenger motor car, which vehicle has at least one electric machine in accordance with the second aspect of the invention. For example, the vehicle can be driven by means of the electric machine, in particular electrically, with the result that the vehicle is configured, for example, as an electric vehicle or hybrid vehicle. In particular, the vehicle can be configured as a battery electric vehicle (BEV). Advantages and advantageous refinements of the first aspect and the second aspect of the invention are to be considered to be advantages and advantageous refinements of the third aspect of the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical or functionally identical elements are provided with identical designations.

DETAILED DESCRIPTION OF THE DRAWINGS

Figure 1:
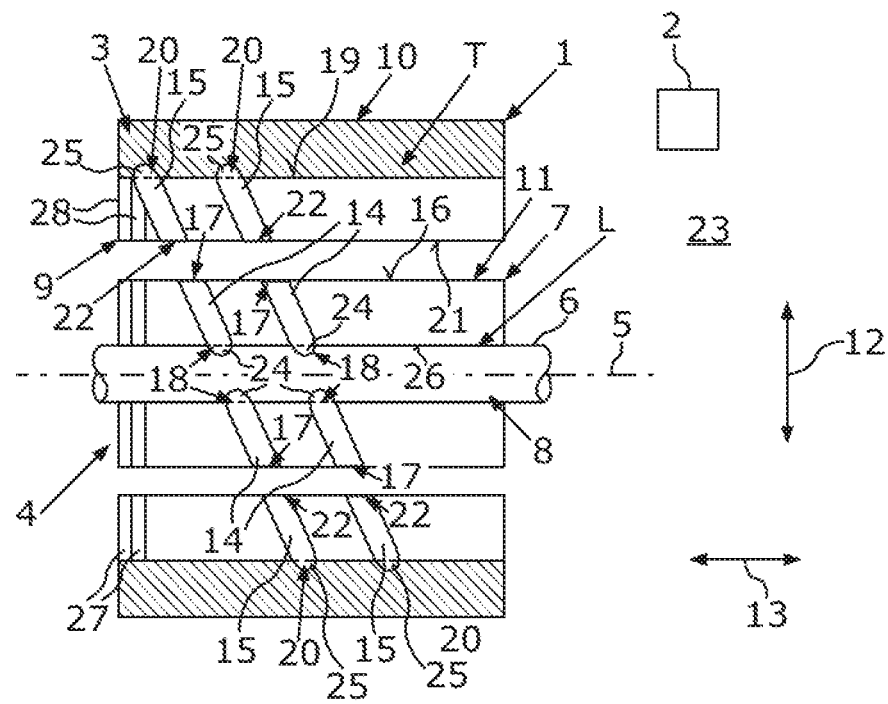
FIG. 1 shows details of a diagrammatic and sectioned side view of an electric machine according to an embodiment of the invention for a motor vehicle which can be driven by the electric machine.

FIG. 1 shows details of a diagrammatic and sectioned side view of an electric machine 1 for a vehicle which is preferably configured as a motor vehicle and is configured here as a motor car, in particular as a passenger motor car. In its completely manufactured state, the motor vehicle therefore comprises the electric machine 1, and can be driven electrically, for example, by means of the electric machine 1. To this end, the electric machine 1 can be operated in a motor mode and therefore as an electric motor. In order to operate the electric machine 1 in the motor mode, the electric machine 1 is supplied with electric energy or electric current. The electric energy or the electric current, with which the electric machine 1 is supplied or is to be supplied in the motor mode, is stored, for example, in an energy store 2 of the motor vehicle, which energy store 2 is configured for storing the electric energy and is shown particularly diagrammatically in FIG. 1. The electric machine 1 and the energy store 2 are preferably configured as high voltage components, with the result that a respective electric voltage, in particular a respective electric operating voltage or rated voltage, of the respective high voltage component is greater than 12 volts and is preferably at least 48 volts. The electric voltage, in particular the electric operating voltage or rated voltage, is preferably greater than 48 volts and is preferably greater than 50 volts. The electric voltage, in particular the electric operating voltage or rated voltage, is preferably several hundred volts, with the result that particularly great electric power outputs can be realized for driving the motor vehicle electrically. In particular, the energy store 2 can be configured as a battery, in particular as a high voltage battery (HV battery). The electric machine 1 has a stator 3 and a rotor 4 which can be driven by the stator 3 and, as a result, can be rotated about a rotational axis 5 relative to the stator 3. In the motor mode, the rotor 4 is driven by the stator 3 and, as a result, is rotated about the rotational axis 5 relative to the stator 3.

The rotor 4 has a shaft 6 which is also called a rotor shaft and via which, at least in its motor mode, the electric machine 1 can provide torques for driving the motor vehicle electrically. Moreover, the rotor 4 has a first laminated core 7 which is also called a rotor laminated core and is connected fixedly to the shaft 6 so as to rotate with it. Here, the laminated core 7 is arranged on the shaft 6. To this end, the laminated core 7 has a receiving opening 8 which is configured as a through opening and is penetrated by the shaft 6. Therefore, at least one length region L is arranged in the receiving opening 8, with the result that, for example, the laminated core 7 surrounds at least the length region L (also called a part) of the shaft 6 in its circumferential direction, in particular in a completely circumferential manner. It can be seen from FIG. 1, in particular, that the shaft 6 is a component of the electric machine 1, in particular of the rotor 4 of the electric machine 1, the laminated core 7 surrounding at least the length region L of the shaft 6 of the rotor 4.

The stator 3 has a second laminated core 9 which is also called a stator laminated core. Moreover, the stator 3 has a component in the present case in the form of a carrier 10 which is also called a carrier element or stator carrier. Here, the laminated core 9 is surrounded on the outer circumferential side at least in a part region T which is also called a second length region by the carrier 10 (component) on the outer circumferential side. The laminated core 9 and the carrier 10 are components which are configured separately from one another and are connected to one another. In particular, the laminated core 9 is held on or fastened to the carrier 10. For example, the laminated core 7 and the shaft 6 are configured as components which are configured separately from one another and are connected to one another, the laminated core 7 being connected fixedly to the shaft 6 so as to rotate with it.

It can be seen particularly clearly from FIG. 1 that an air gap 11 is arranged in the radial direction of the electric machine 1 between the rotor 4 and the stator 3, in particular between the laminated cores 7 and 9, by which air gap 11 the laminated cores 7 and 9 are spaced apart from one another in the radial direction of the electric machine 1. The radial direction of the electric machine 1 and therefore of the stator 3 and the rotor 4 is illustrated in FIG. 1 by way of a double arrow 12. Moreover, FIG. 1 illustrates the axial direction of the electric machine 1 and therefore of the stator 3 and the rotor 4 by way of a double arrow 13, the axial direction running perpendicularly with respect to the radial direction. The axial direction coincides, for example, with the rotational axis 5, or vice versa. As can be seen from FIG. 1, the air gap 11 is delimited in the radial direction of the electric machine 1 toward the outside, in particular directly, by way of the laminated core 9 and in the radial direction toward the inside, in particular directly, by way of the laminated core 7.

In each case a plurality of cooling ducts 14 and 15 run in the respective laminated core 7 and 9, respectively, that is to say within the respective laminated core 7 and 9, respectively, the cooling ducts 14 running within the laminated core 7 of the rotor 4, and the cooling ducts 15 running within the laminated core 9 of the stator 3. For example, the cooling ducts 14 are connected fluidically to one another among one another and/or the cooling ducts 15 can be connected fluidically to one another among one another, for example. The respective cooling duct 14 and 15 can be flowed through by a cooling fluid which is preferably configured as a liquid and is also called a cooling medium or cooling liquid for cooling the respective laminated core 7 and 9, respectively. Moreover, the respective cooling duct 14 and 15 is delimited directly by way of the respective laminated core 7 and 9, respectively, along its respective circumferential direction, in particular in a completely circumferential manner. As a result, the cooling fluid which flows through the respective cooling duct 14 and 15 can flow directly onto and therefore make direct contact with the respective laminated core 7 and 9, respectively, with the result that a particularly advantageous, efficient and effective transfer of heat can take place from the respective laminated core 7 and 9, respectively, to the cooling fluid which flows through the respective cooling duct 14 and 15, respectively. As a result, a particularly high quantity of heat can be transported away from the respective laminated core 7 and 9, as a result of which the electric machine 1 can advantageously be cooled.

In order for it then to be possible for a particularly advantageous, effective and efficient cooling system of the electric machine 1 to be realized, which cooling system is configured, for example, as a liquid cooling system, in particular as an oil cooling system, the respective cooling duct 14 has at least one first throughflow opening 17 which can be flowed through by the cooling fluid and penetrates an outer circumferential-side shell face 16 of the laminated core 7, which shell face 16 points toward the outside in the radial direction of the laminated core 7. Moreover, the respective cooling duct 14 has at least one second throughflow opening 18 which can be flowed through by the cooling fluid and penetrates an inner circumferential-side shell face 26 of the laminated core 7, which shell face 26 points toward the inside in the radial direction of the laminated core 7.

The respective cooling duct 15 has at least one first throughflow opening 20 which can be flowed through by the cooling fluid and penetrates an outer circumferential-side shell face 19 of the laminated core 9, which shell face 19 points toward the outside in the radial direction of the laminated core 9. Moreover, the respective cooling duct 15 has at least one second throughflow opening 22 which can be flowed through by the cooling fluid and penetrates an inner circumferential-side shell face 21 of the laminated core 9, which shell face 21 points toward the inside in the radial direction of the laminated core 9. Via the respective throughflow openings 17, 18, 20 and 22, the respective cooling duct 14 and 15, respectively, opens into a respective surrounding area 23 of the respective laminated core 7 and 9, respectively. In particular per cooling duct 14, the shaft 6 has, for example, one first channel 24 which can be flowed through by the cooling fluid and is connected fluidically via the respective throughflow opening 18 to the respective cooling duct 14. Therefore, the respective cooling duct 14 opens at one end via the respective throughflow opening 18 into the duct 24. At the other end, the respective cooling duct 14 opens via the respective throughflow opening 17 into the air gap 11.

In particular per cooling duct 15, the carrier 10 has one respective line element in the form of a respective second duct 25 which is connected fluidically via the respective throughflow opening 20 to the respective cooling duct 15. Therefore, for example, the respective cooling duct 15 opens at one end via the respective throughflow opening 20 into the respective second duct 25. At the other end, the respective cooling duct 15 opens via the respective throughflow opening 22 into the air gap 11. As a result, for example, the cooling fluid which first of all flows through the respective first duct 24 can flow from the duct 24 via the throughflow opening 18 into the respective cooling duct 14, and can flow through the respective cooling duct 14. The cooling fluid which flows through the cooling duct 14 can flow via the respective throughflow opening 17 out of the cooling duct 14, and into the air gap 11. From the air gap 11, the cooling fluid can flow through the respective throughflow opening 22 and therefore into the respective cooling duct 15. The cooling fluid which flows through the respective cooling duct 15 can then flow through the respective throughflow opening 20 and therefore via the respective throughflow opening 20 out of the respective cooling duct 15 and into the respective duct 25 and, as a consequence, can flow through the respective duct 25. In this way, the rotor 4 and the stator 3 and therefore the electric machine 1 overall can be cooled particularly effectively and efficiently.

In order to keep flow paths particularly small, the respective cooling duct 14 and 15 extends from the respective throughflow opening 17 and 20, respectively, without interruptions or continuously to the respective throughflow opening 18 and 22, respectively, obliquely with respect to the axial direction and obliquely with respect to the radial direction of the respective laminated core 7 and 9, respectively, the respective cooling duct 14 and 15 extending rectilinearly from the respective throughflow opening 17 and 20, respectively, without interruptions or continuously, to the respective throughflow opening 18 and 22, respectively.

The respective laminated core 7 and 9 is constructed from a respective plurality of lamination segments 27 and 28, respectively, which follow one another in the axial direction of the laminated core 7 and 9, respectively. Here, the respective cooling duct 14 and 15 is formed by way of respective through openings of the lamination segments 27 and 28, respectively. This can be seen, in particular, from FIG. 2 on the basis of the laminated core 9 which is shown there. Those through openings of the lamination segments 28 which form the respective cooling duct 15 are denoted by 29 in FIG. 2. It can be seen from FIG. 2 that the through openings 29 are arranged offset with respect to one another in the radial direction of the laminated core 9, with the result that respective first parts of the through openings 29 overlap one another, whereas respective second parts of the through opening 29 are arranged without an overlap with respect to one another. As a result, the respective cooling duct 14 and 15 runs obliquely with respect to the axial direction and obliquely with respect to the radial direction and therefore at least substantially conically through the respective laminated core 7 and 9, respectively.

Figure 2:
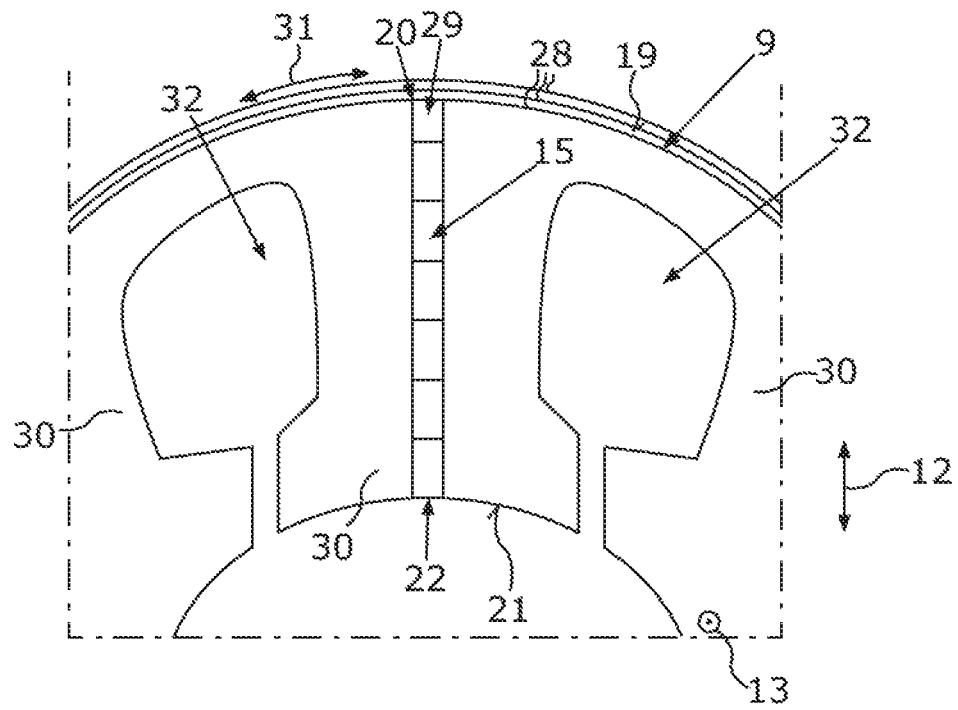
FIG. 2 shows details of a diagrammatic front view of a laminated core of the electric machine.

It can be seen, in particular, from FIG. 2 using the example of the laminated core 9 that the laminated core 7 and 9 can have teeth 30 which are arranged so as to follow one another in the circumferential direction of the laminated core 7 and 9, respectively. The circumferential direction of the laminated core 9 is illustrated in FIG. 2 by way of a double arrow 31. For example, at least one winding (not shown in the figures) of the stator 3 and the rotor 4 is wound around the respective tooth 30 and is therefore held on the respective tooth, with the result that the winding is arranged in respective grooves 32 of the respective laminated core 7 and 9, respectively, which are arranged between the respective teeth 30. Here, the cooling duct 15 which runs without interruptions and rectilinearly from the throughflow opening 20 to the throughflow opening 22 penetrates the tooth 30, with the result that the throughflow openings 20 and 22 are arranged in the circumferential direction of the laminated core 9 between the grooves 32 and in the process in the tooth 30. As a result, the electric machine 1 can be cooled effectively and efficiently.

For example, the winding becomes hot during the motor mode. It is contemplated here to bring about a cooling fluid mist which is configured, for example, as an oil mist in the electric machine 1, in order to cool the winding, in particular its winding heads. As an alternative or in addition to this, it is then possible to realize targeted or controlled conducting of the cooling fluid through the electric machine 1 by means of the cooling ducts 14 and 15. In order to avoid, for example, an excessively great quantity of the cooling fluid being situated or collecting in the air gap 11, a suction device can be provided, by means of which the cooling fluid or at least one part of the cooling fluid can be extracted or is extracted from the air gap 11.

The cooling fluid flows, for example, first of all through the cooling ducts 14 and thereupon out of the cooling ducts 14 into the air gap 11. Then, for example, the cooling fluid flows from the air gap 11 into and through the cooling ducts 15. Here, switchable conducting of the cooling fluid can possibly be provided, such as in the case of dry sump lubrication, in particular by virtue of the fact that the cooling fluid or at least part of the cooling fluid is extracted from the air gap 11 in a targeted manner. By virtue of the fact that the respective cooling duct 14 and 15 is formed by way of the through openings 29 which are arranged offset with respect to one another, the lamination segments 27 and 28 and therefore the cooling ducts 14 and 15 can be manufactured particularly simply, by, for example, the lamination segments 27 and 28 being turned relative to one another during their manufacture. As an alternative or in addition, the use of switchable stamping punches is contemplated. Therefore, for example, the through openings 29 are produced by way of stamping.

The ducts 24 act as pockets, via which the cooling fluid is discharged from the cooling ducts 14 or is introduced into the cooling ducts 14. As an alternative or in addition, the ducts 25 act as pockets, via which the cooling fluid is introduced into the cooling ducts 15 or is discharged from the cooling ducts 15. In particular, an advantageous flow of the cooling fluid through the electric machine 1 can be ensured, with the result that the cooling fluid does not come to a standstill. As a result, a particularly great quantity of heat can be transported away in a short time.

LIST OF DESIGNATIONS

1 Electric machine
2 Energy store
3 Stator
4 Rotor
5 Rotational axis
6 Shaft
7 Laminated core
8 Receiving opening
9 Laminated core
10 Carrier
11 Air gap
12 Double arrow
13 Double arrow
14 Cooling duct
15 Cooling duct
16 Outer circumferential-side shell face
17 Throughflow opening
18 Throughflow opening
19 Outer circumferential-side shell face
20 Throughflow opening
21 Inner circumferential-side shell face
22 Throughflow opening
23 Surrounding area
24 Duct
25 Duct
26 Inner circumferential-side shell face
27 Lamination segment
28 Lamination segment
29 Through openings
30 Tooth
31 Double arrow
32 Groove
L Length region
T Part The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A laminated core for an electric machine, comprising:
a first cooling duct which runs within the laminated core and through which a cooling fluid for cooling the laminated core is flowable,
wherein the first cooling duct comprises:
a first throughflow opening through which the cooling fluid is flowable and penetrates an outer circumferential-side shell face of the laminated core, which shell face points toward the outside in a radial direction of the laminated core; and
a second throughflow opening through which the cooling fluid is flowable and penetrates an inner circumferential-side shell face of the laminated core, which shell face points toward the inside in the radial direction of the laminated core,
wherein the first cooling duct extends from the first throughflow opening to the second throughflow opening obliquely with respect to the radial direction of the laminated core,
wherein the first cooling duct extends rectilinearly from the first throughflow opening to the second throughflow opening,
wherein the second throughflow opening is configured to receive the cooling fluid from a first channel within a shaft surrounded by the laminated core,
wherein the first throughflow opening is configured to direct the cooling fluid to a second cooling duct within the laminated core,
wherein the first throughflow opening is configured to direct the cooling fluid to the second cooling duct via an air gap between the first throughflow opening and the second cooling duct,
wherein the second cooling duct is configured to direct the cooling fluid to a duct within a carrier surrounding the laminated core, and
wherein the cooling fluid is flowable along a same direction through the first cooling duct and the second cooling duct.

2. The laminated core according to claim 1, wherein over a complete extent which runs without interruptions from the first throughflow opening as far as the second throughflow opening, the first cooling duct is delimited directly by way of the laminated core in a manner which runs around completely in a circumferential direction of the first cooling duct.

3. The laminated core according to claim 1, wherein the laminated core is constructed from a plurality of lamination segments which follow one another in the axial direction of the laminated core, the first cooling duct being formed by way of respective through openings of the lamination segments.

4. The laminated core according to claim 3, wherein the through openings are arranged offset with respect to one another in the radial direction of the laminated core.

5. The laminated core according to claim 1, wherein the second cooling duct penetrates a tooth of the laminated core.

6. An electric machine for a vehicle which is drivable by the electric machine, comprising:
- a laminated core; and
- a first cooling duct which runs within the laminated core and through which a cooling fluid for cooling the laminated core is flowable, wherein the first cooling duct comprises:
- a first throughflow opening which through which the cooling fluid is flowable and penetrates an outer circumferential-side shell face of the laminated core, which shell face points toward the outside in a radial direction of the laminated core; and
- a second throughflow opening through which the cooling fluid is flowable and penetrates an inner circumferential-side shell face of the laminated core, which shell face points toward the inside in the radial direction of the laminated core, wherein the first cooling duct extends from the first throughflow opening to the second throughflow opening obliquely with respect to the radial direction of the laminated core, wherein the first cooling duct extends rectilinearly from the first throughflow opening to the second throughflow opening, wherein the second throughflow opening is configured to receive the cooling fluid from a first channel within a shaft surrounded by the laminated core, wherein the first throughflow opening is configured to direct the cooling fluid to a second cooling duct within the laminated core, wherein the first throughflow opening is configured to direct the cooling fluid to the second cooling duct via an air gap between the first throughflow opening and the second cooling duct, wherein the second cooling duct is configured to direct the cooling fluid to a duct within a carrier surrounding the laminated core, and wherein the cooling fluid is flowable along a same direction through the first cooling duct and the second cooling duct.

7. A vehicle comprising at least one electric machine according to claim 6.

* * * * *